(12) United States Patent
Juhlin

(10) Patent No.: US 12,276,365 B2
(45) Date of Patent: Apr. 15, 2025

(54) LAUNCHING PIPELINE PIGS

(71) Applicant: Subsea 7 Norway AS, Stavanger (NO)

(72) Inventor: Rasmus Asp Juhlin, Stavanger (NO)

(73) Assignee: SUBSEA 7 NORWAY AS, Stavanger (NO)

( * ) Notice: Subject to any disclaimer, the term of this patent is extended or adjusted under 35 U.S.C. 154(b) by 0 days.

(21) Appl. No.: 17/766,727

(22) PCT Filed: Oct. 7, 2020

(86) PCT No.: PCT/EP2020/078183
§ 371 (c)(1),
(2) Date: Apr. 5, 2022

(87) PCT Pub. No.: WO2021/069530
PCT Pub. Date: Apr. 15, 2021

(65) Prior Publication Data
US 2024/0044438 A1   Feb. 8, 2024

(30) Foreign Application Priority Data

Oct. 7, 2019   (GB) ..................................... 1914450

(51) Int. Cl.
*F16L 55/46*   (2006.01)
*F16L 55/38*   (2006.01)

(52) U.S. Cl.
CPC ............... *F16L 55/46* (2013.01); *F16L 55/38* (2013.01)

(58) Field of Classification Search
CPC .................................. F16L 55/46; F16L 55/38
See application file for complete search history.

(56) References Cited

U.S. PATENT DOCUMENTS 3,730,267 A * 5/1973 Scott ..................... E21B 33/146
166/291
4,011,620 A   3/1977 Southgate
(Continued)

FOREIGN PATENT DOCUMENTS

EP   1 987 282   11/2008
GB   1 498 804   1/1978
(Continued)

OTHER PUBLICATIONS

Communication Pursuant to Article 94(3) EPC received in corresponding European Application No. 20 800 008.3 dated Dec. 13, 2023.

*Primary Examiner* — Erin F Bergner
(74) *Attorney, Agent, or Firm* — MATTINGLY & MALUR, PC

(57) ABSTRACT

A pipeline pig is launched by directing a flow of fluid to, and through, the pig while conveying a launching element to the pig, entrained in the flow. Interaction between the launching element and the pig then blocks the flow through the pig to launch the pig. The launching element can be a spherical plug that blocks a through-passage extending longitudinally through the pig, hence serving as a barrier to the flow through the pig, or can trigger a mechanism that blocks the flow through the pig. The flow entraining the launching element can be directed through at least one other pig to be launched subsequently, positioned upstream of the pig being launched. A succession of launching elements can be released into the flow, each configured to interact with a respective one of a series of pigs. Successively released launching elements can increase in diameter from element to element.

30 Claims, 10 Drawing Sheets

(56) References Cited

U.S. PATENT DOCUMENTS

| | | |
|---|---|---|
| 5,208,936 A | 5/1993 | Campbell |
| 6,022,421 A | 2/2000 | Bath et al. |
| 6,508,387 B1 * | 1/2003 | Simon .................. B65D 90/587 |
| | | 137/554 |
| 8,296,894 B2 | 10/2012 | Watson et al. |
| 8,715,423 B2 | 5/2014 | Mousa |
| 10,119,647 B2 | 11/2018 | Soliman |
| 10,955,083 B2 | 3/2021 | Haneford |
| 2002/0170599 A1 | 11/2002 | Disher et al. |
| 2009/0083922 A1 * | 4/2009 | Watson .................. F16L 55/46 |
| | | 15/104.062 |
| 2010/0170535 A1 | 7/2010 | Freeman et al. |
| 2019/0143383 A1 | 11/2019 | Al-Mahrous |

FOREIGN PATENT DOCUMENTS

| | | |
|---|---|---|
| GB | 2 196 715 | 5/1988 |
| GB | 2565781 | 2/2019 |
| KR | 20130132056 | 12/2013 |
| WO | WO 2010/065478 | 6/2010 |
| WO | WO 2015/126670 | 8/2015 |
| WO | WO 2019/038273 | 2/2019 |

* cited by examiner

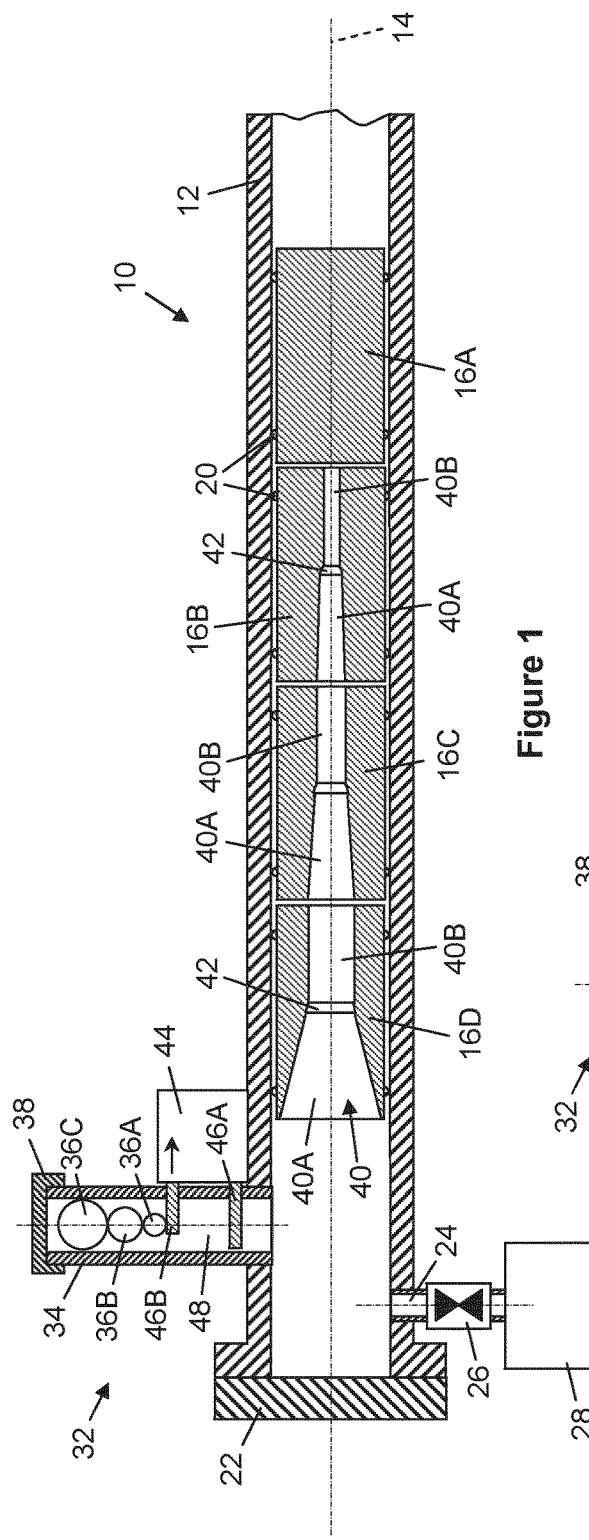

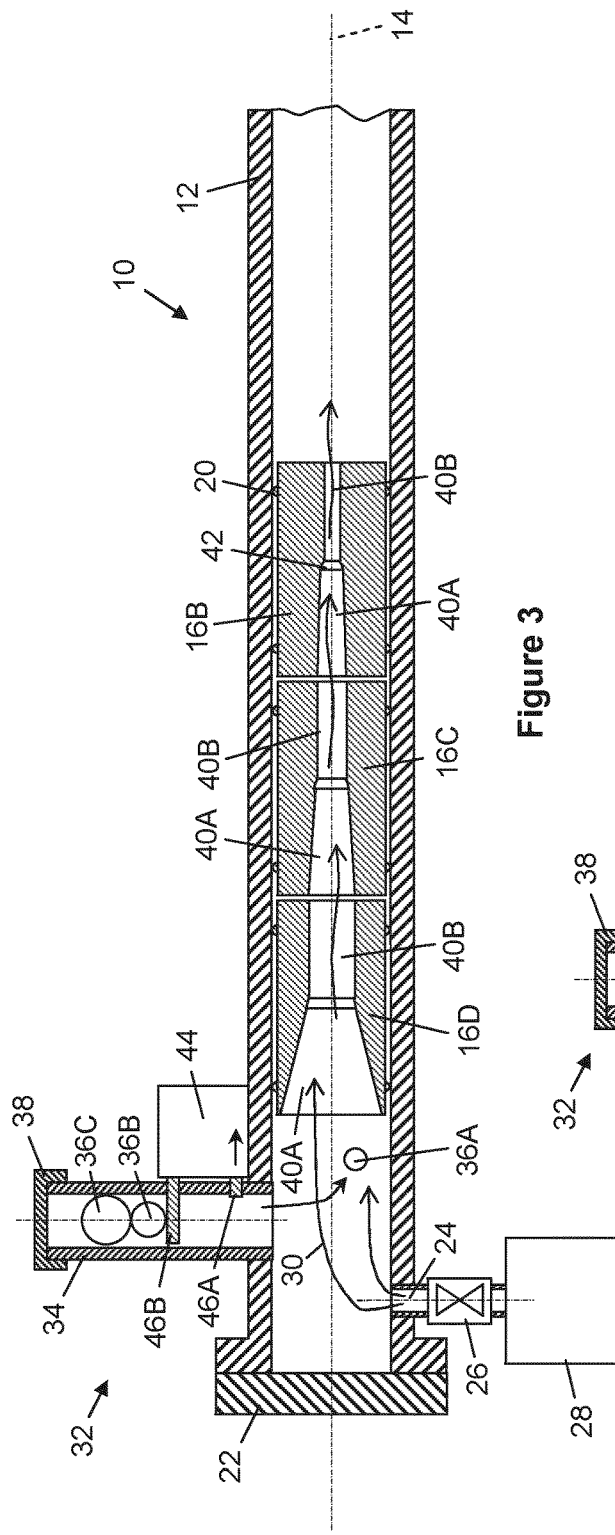
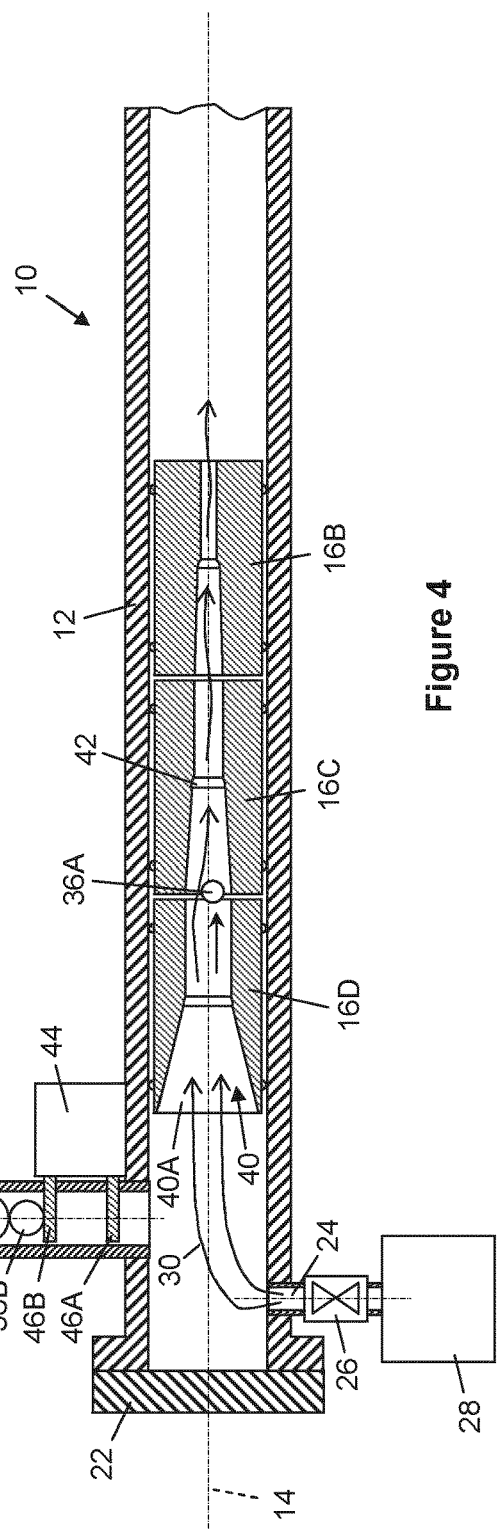

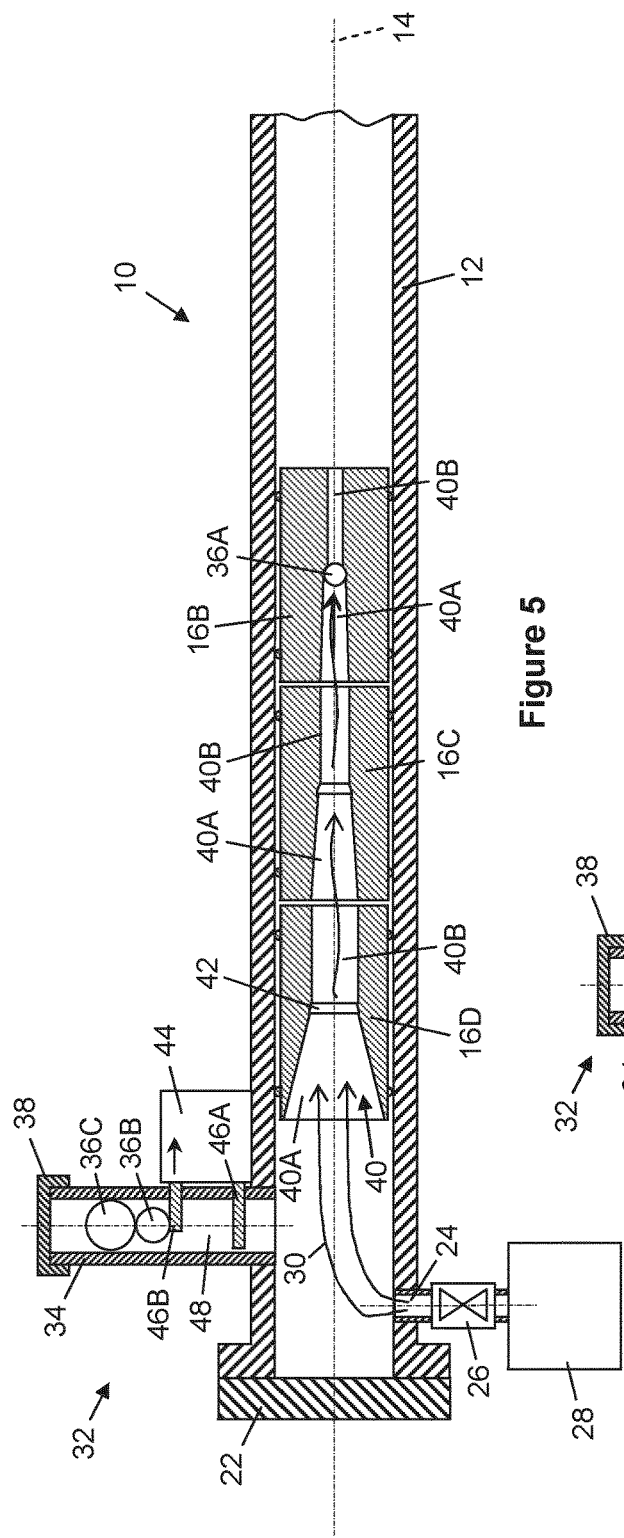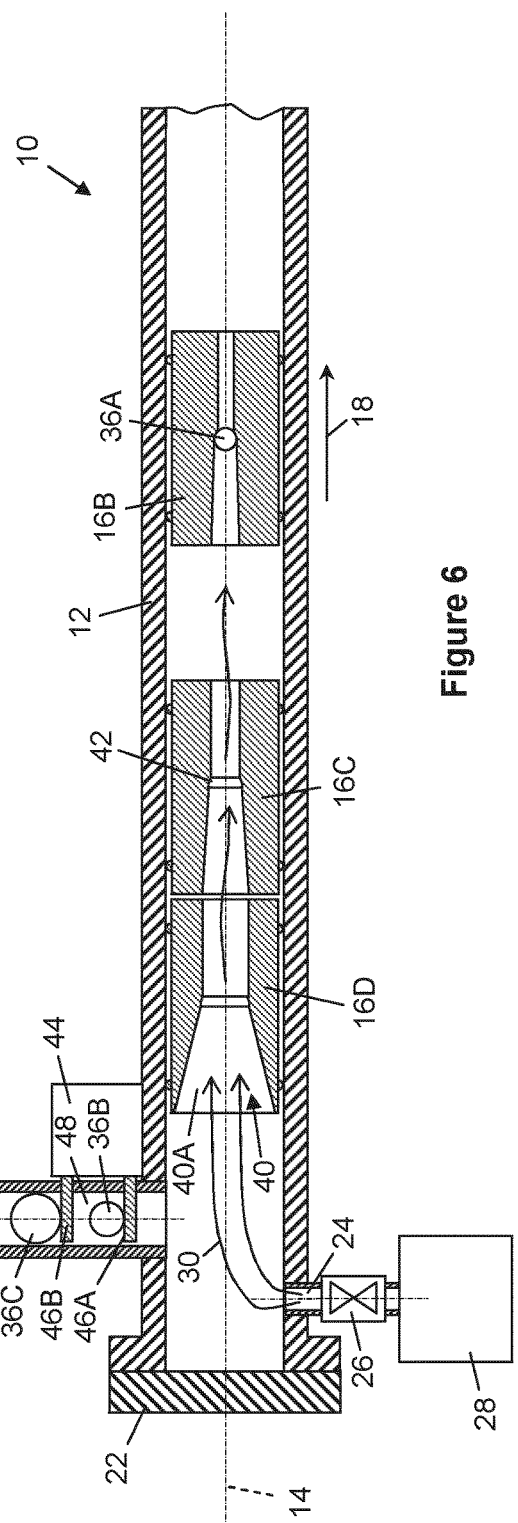

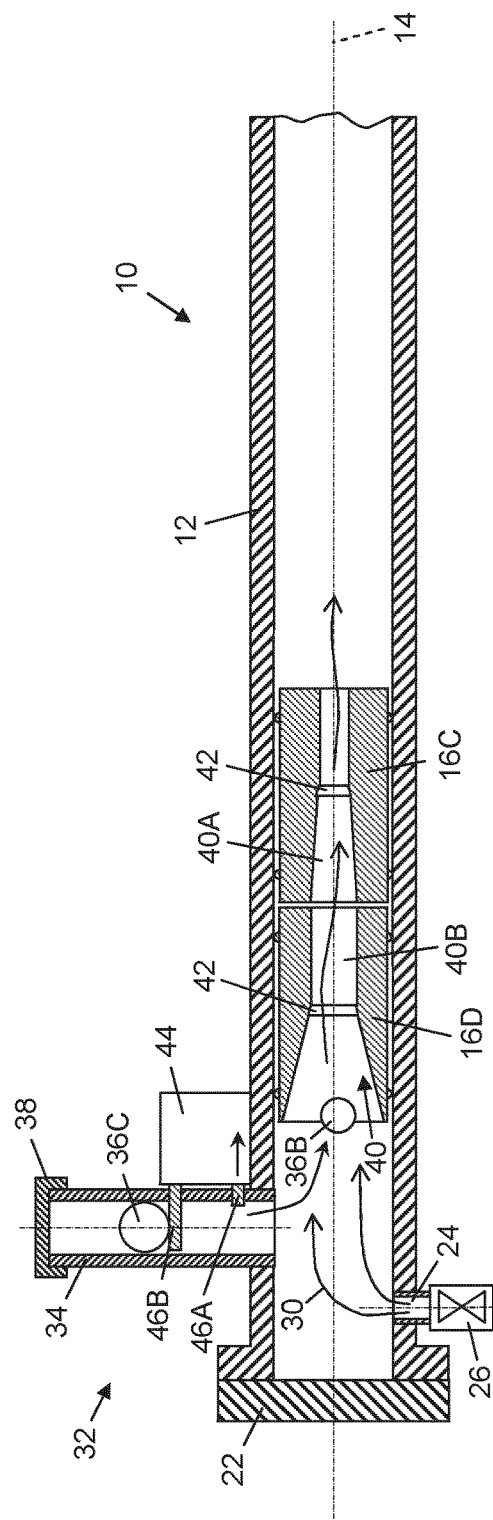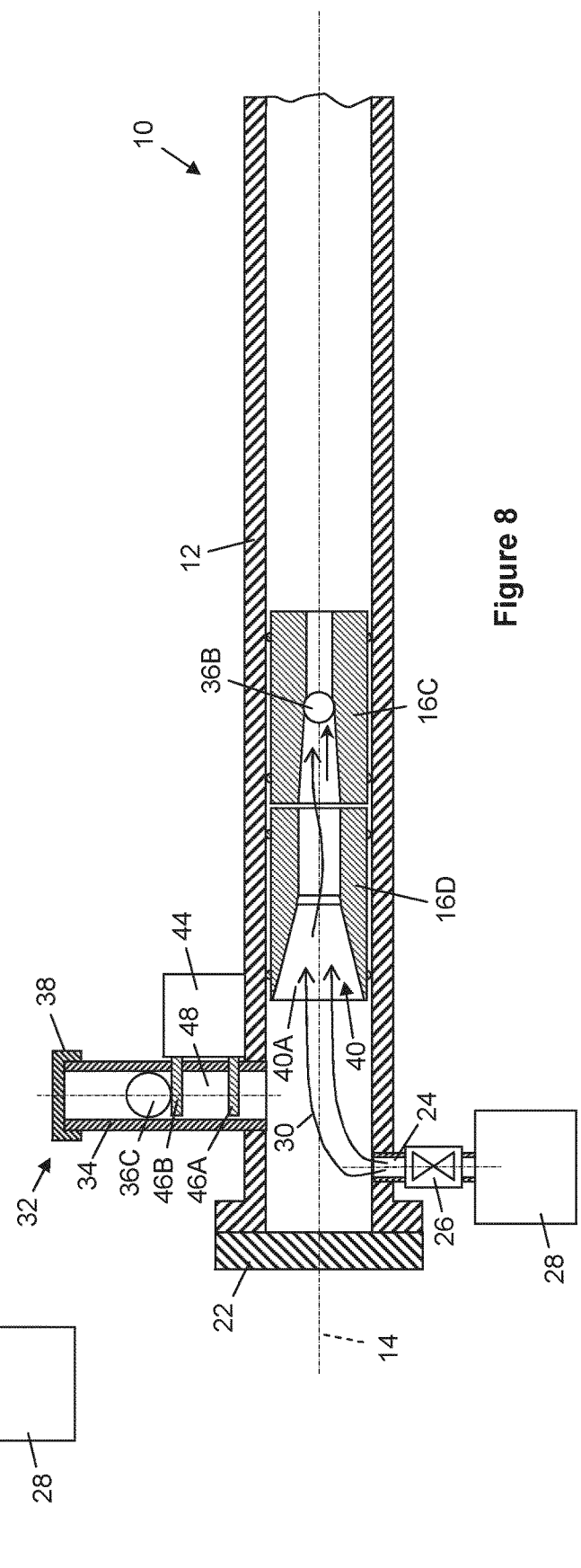

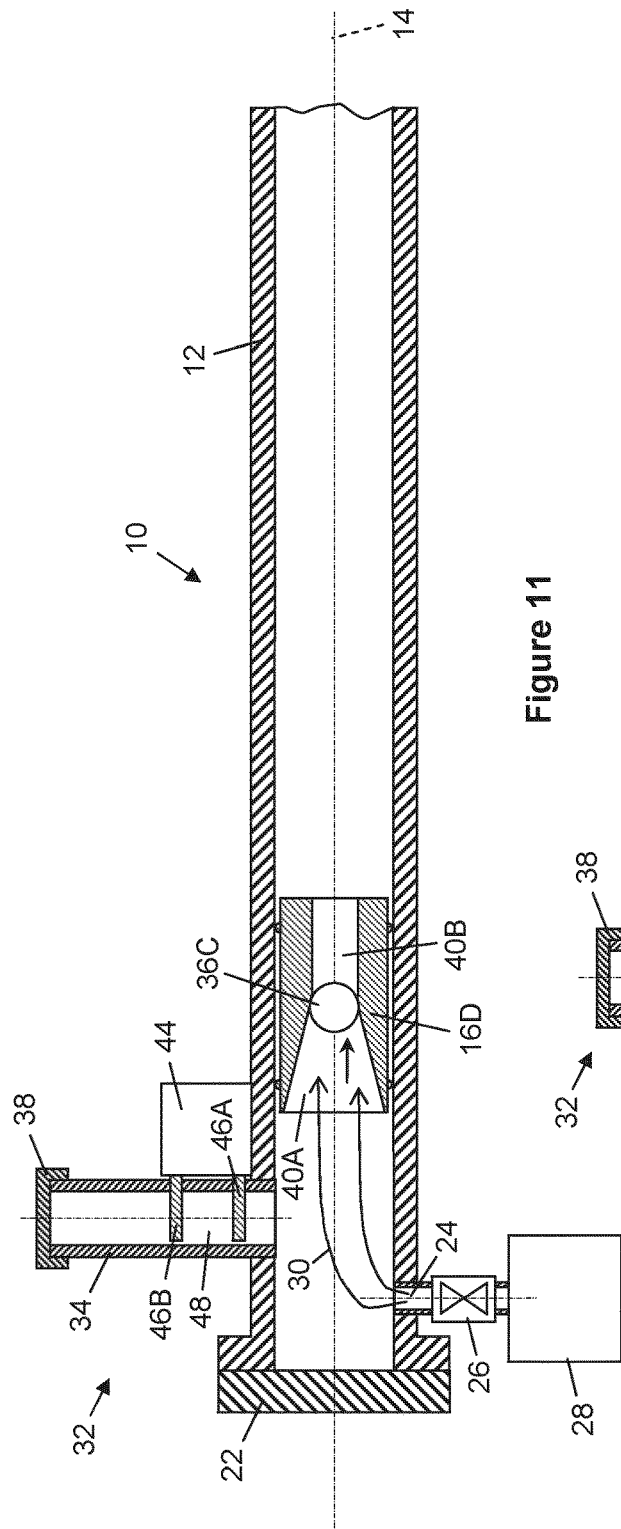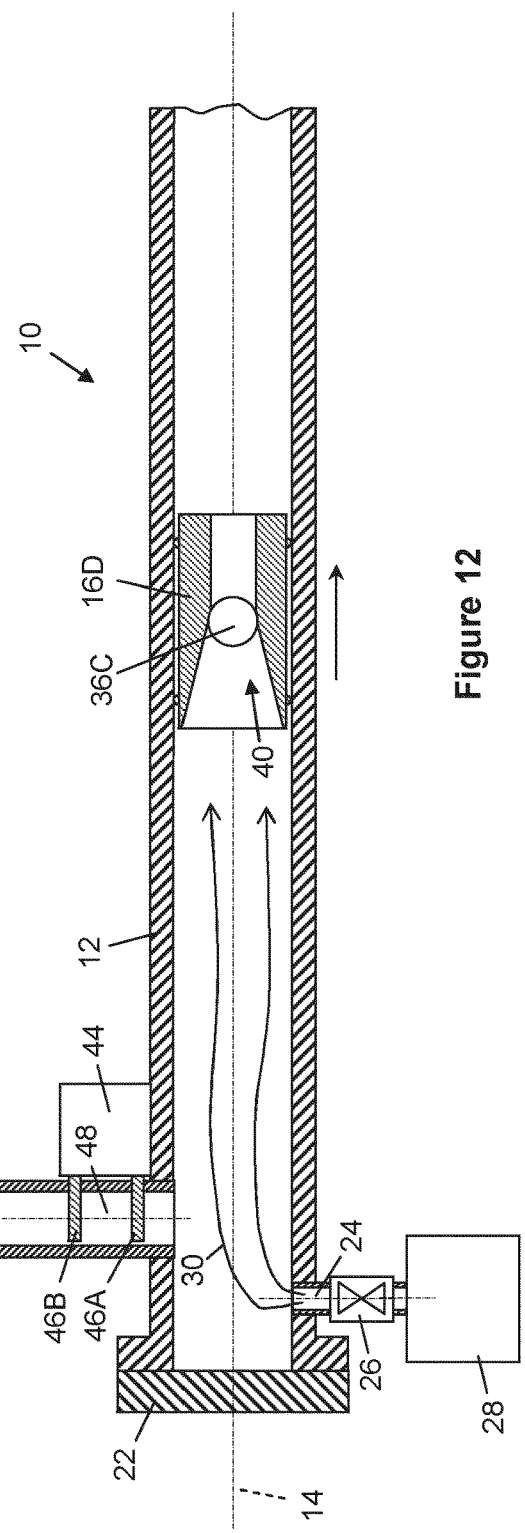

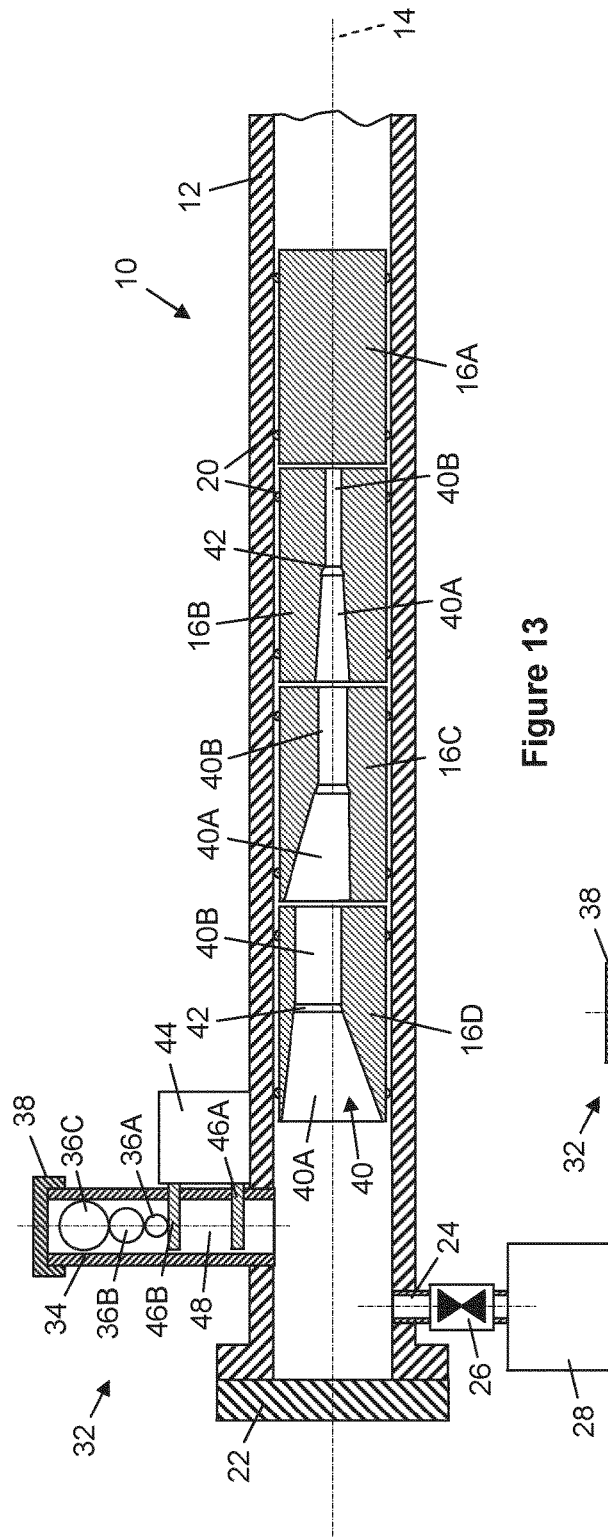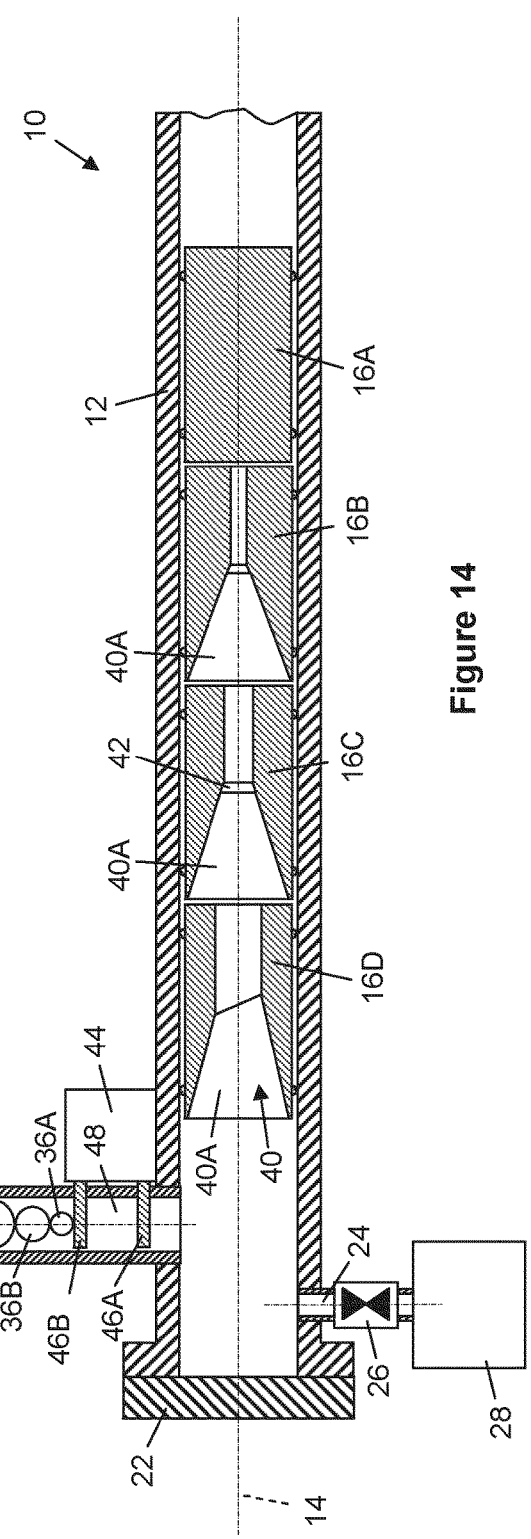

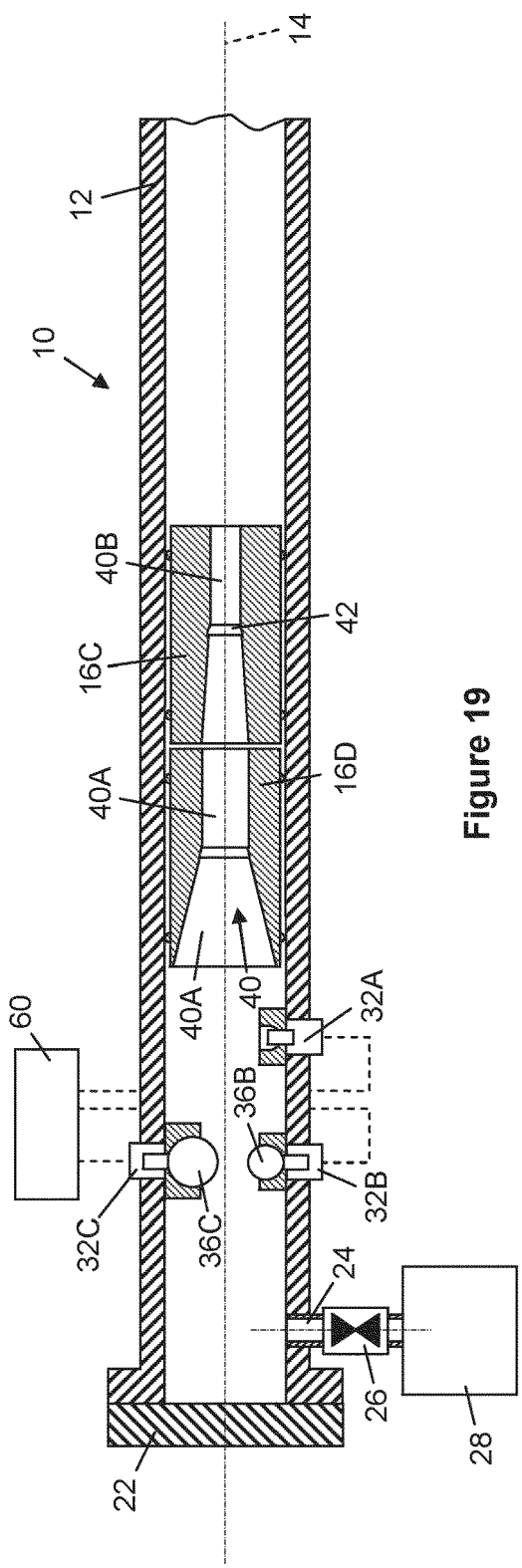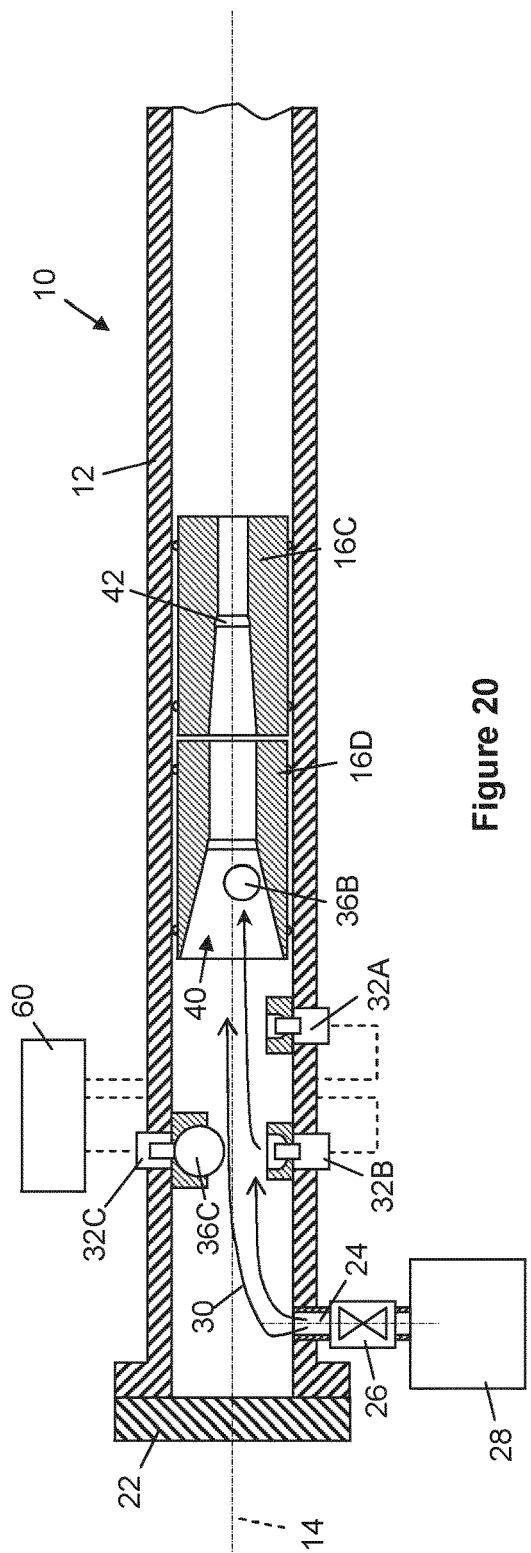

LAUNCHING PIPELINE PIGS

This invention relates to pipeline pigs, as are typically used for cleaning, flushing, dewatering, inspecting or pressure-testing a pipeline from within.

The invention relates particularly to the challenges of launching multiple pigs into a pipeline, and the problems suffered by traditional pig launchers in this respect. Those problems are heightened where pipelines are underwater, as in the offshore oil and gas industry in particular.

Pigs may have various shapes of circular cross-section, such as spheres, cylinders or dumbbells. Their outer diameter is selected to be substantially equal to the inner diameter of the pipeline in question. Thus, a pig is a close sliding or interference fit within and against the interior of the pipeline.

In use, pigs are injected into and propelled along a pipeline by fluid pressure. Specifically, a pressure differential is created within the pipeline between a volume ahead of the pig and a volume behind the pig, with respect to the intended direction of travel.

To maintain the necessary pressure differential, a pig has a series of annular or disc-shaped circumferential seals that separate the volume within the pipeline ahead of the pig from the volume within the pipeline behind the pig. The seals are suitably stiff enough to provide a scraping action so as to clean and flush the interior of the pipeline as the pig moves along the pipeline.

Most conveniently, the desired pressure differential is created by introducing high-pressure fluid through a pressure inlet into a volume behind the pig, initially within a launching apparatus and then, after injection, within the pipeline.

Pigs are typically launched into a pipeline from a pig launcher or trap that propels the pigs into and along the pipeline with the relevant pressure differential. A pig launcher comprises a pipe section defining a chamber for housing one or more pigs. That chamber is supplied with high-pressure fluid through one or more pressure inlets controlled by valves. The chamber communicates with the interior of the pipeline through an access opening that may be disposed at an end of the pipeline or anywhere along the length of the pipeline.

Where there is only one pig, a pig launcher can be quite simple because only one pressure inlet is needed behind the pig to propel it into the pipeline. Thus, a pig launcher containing only one pig can be compact and have simple piping and valve arrangements. However, such a pig launcher must be reloaded with another pig after each pig is launched. This requires repeatedly opening an end cap of the pig launcher, which may contain pressurised fluid, and so is disadvantageous for subsea use.

For this reason, it is desirable for a pig launcher to contain two or more pigs and to make provision for those pigs to be launched successively and separately into and along a pipeline when required. U.S. Pat. No. 6,022,421 discloses an example of a multiple pig launcher, which comprises a pipe section that holds a succession or train of pigs in series and is supplied with high-pressure fluid through various valves and pressure inlets.

Multiple pig launchers are complex, bulky and expensive, not least because each pig may require its own longitudinally-spaced inlet for high-pressure fluid. Consequently, a multiple pig launcher is generally removed from a pipeline after use to enable it to be re-used elsewhere. Another reason for removing and recovering a pig launcher from a subsea pipeline is that ensuring safe and reliable operation of a pig launcher left underwater for the entire life of the pipeline, which is typically in excess of twenty years, would require extremely stringent and expensive design parameters. This is impractical for equipment that requires only intermittent use.

Removing a pig launcher from a subsea pipeline requires the great expense of additional vessel intervention on site. Additionally, its removal involves properly sealing the access opening that communicates with the interior of the pipeline.

US 2002/170599 teaches how a multiple pig launcher can be made more compact by using a rotary pig magazine. However as that design is complex and relies upon gravity to drop pigs successively into a pipeline, it may be unreliable. Also, the design is not suitable for subsea use. Even if the design was adapted for subsea use, it would still be necessary to remove the pig launcher from a subsea pipeline after use.

GB 1498804 discloses a pig launcher for launching spherical pigs. Pressurised fluid is directed between two such pigs to launch a first pig and then behind a second pig to launch the second pig. For this purpose, the second pig is contained within a sleeve within the launcher pipe, which requires that pig, at least, to be compressible to the substantial extent necessary to fit into the sleeve. Aside from that restriction, the arrangement disclosed in GB 1498804 cannot readily be adapted to accommodate more than two pigs.

EP 1987282 discloses a simplified pig-launching system in which a multiple pig launcher contains an in-line train or series of pigs abutting end-to-end but only has one fluid inlet. To achieve this, each pig of the series contains a central tube that extends axially along the full length of the pig. Thus, the tubes of successive pigs cooperate to form a central pipe or duct that extends through and along the series.

Each pig of EP 1987282 has a valve at a leading end, which valve is capable of closing the tube of that pig, and a hollow protrusion at a trailing end aligned with and communicating with the tube. When the pigs abut with their neighbours in series, the protrusion of each pig holds open the valve of the pig immediately behind. This allows the first pig at a leading end of the series to be launched by applying a burst of elevated fluid pressure through the central duct formed by the successive tubes of the pigs. When the first pig has been launched, the valve in the second pig closes under spring bias to allow the second pig to be launched, in turn, by applying a further burst of elevated fluid pressure through the duct.

Whilst simple in principle, the system disclosed in EP 1987282 suffers drawbacks that add complexity in practice. For example, the risk that pigs could be launched inadvertently requires an additional remotely-controlled system to hold a valve of a pig open until that pig is to be launched. The complexity and expense of such a system is undesirable, particularly in an industry that regards pigs as consumable items.

WO 2010/065478 discloses a dumbbell-type pig in which a flow passage defined within a central tubular shaft can be closed by a valve. The valve is normally closed to enable a pressure differential to drive the pig during launching and along the pipeline. However if the pig encounters an obstacle in the pipeline that blocks progress of the pig, the valve may be opened to apply extra pressure and fluid flow through the flow passage ahead of the pig to clear the obstacle. No solution is proposed to the problem of launching multiple pigs as simply as possible.

WO 2019/038273 successfully addresses the problem of launching multiple pigs but takes a markedly different approach to the present invention.

The invention addresses a need for a simple and reliable launcher structure that can launch successive pigs into a pipeline when required.

Against this background, the present invention resides in a method of launching a pipeline pig, which method comprises: directing a flow of fluid to, and through, the pig being launched; conveying a launching element to the pig by entraining the launching element in the flow of fluid; and by interaction between the launching element and the pig, blocking the flow of fluid through the pig to launch the pig. The launching element may, for example, be a rigid or resilient spheroid or ellipsoid.

The launching element is engaged with, and optionally locked to, the pig being launched, for example by holding the launching element against the pig by virtue of differential pressure applied to the launching element. The launching element suitably serves as a barrier to the flow of fluid through the pig, when so engaged.

The launching element may interact with the pig being launched by triggering a blocking mechanism of that pig, which mechanism consequently blocks the flow of fluid through that pig.

The flow of fluid is suitably directed through at least one other pig to be launched subsequently, which pig is positioned upstream of the pig being launched, with respect to the flow of fluid. Conveniently, the launching element can pass through the or each other pig with the flow of fluid.

A succession of launching elements may be released into the flow of fluid, each launching element being configured to interact with, and thereby to block the flow of fluid through, a respective one of a series of pigs disposed end-to-end in longitudinal succession. For example, the successively-released launching elements may be of increasing diameter from element to element.

The or each launching element suitably has substantially neutral or slightly negative buoyancy in the flowing fluid.

The inventive concept embraces a launcher for pipeline pigs. The launcher comprises a tubular body having: a fluid inlet and an open end, defining a flow direction extending along a flow path within the body from the fluid inlet to the open end; a pig storage region in the flow path for holding a series of pigs; and at least one launching mechanism, positioned upstream of the pig storage region with respect to the flow direction. The or each launching mechanism is configured to hold at least one launching element and is operable to release the or each launching element into the flow path to launch a pig of the series in use.

The launcher further comprises at least one pig held in the pig storage region and at least one launching element held in the at least one launching mechanism. The pig comprises a longitudinal through-passage that is arranged to permit a flow of fluid through the pig in the flow direction along the flow path, and the launching element is configured to engage the pig and to block the flow of fluid along the through-passage to launch the pig, in response to releasing the launching element from the launch mechanism onto the flow path.

The through-passage may comprise a seat that is shaped to complement the launching element. More generally, at least a portion of the through-passage is narrower than the launching element. For example, an upstream portion of the through-passage may be wider than the launching element and a downstream portion of the through-passage may be narrower than the launching element. At least a portion of the through-passage suitably tapers downstream with respect to the flow direction.

The pig storage region may contain a series of pigs disposed end-to-end in longitudinal succession in the flow direction, the through-passages of at least two of those pigs being in mutual fluid communication. For example, the communicating through-passages of the at least two pigs may be in mutual radial alignment with respect to a central longitudinal axis of the tubular body. The through-passages of the at least two pigs may have respective minimum widths that reduce from pig to pig in the flow direction.

The inventive concept also extends to a pipeline pig, comprising: a longitudinal through-passage that is arranged to permit a flow of fluid through the pig; and a seat for a discrete launching element that, when positioned in the seat, blocks the flow of fluid through the through-passage, the launching element being conveyable to the pig entrained in the flow of fluid.

The through-passage comprises a relatively wide upstream portion and a relatively narrow downstream portion, the seat being disposed between the relatively wide upstream portion and the relatively narrow downstream portion.

Another pipeline pig of the invention comprises: a longitudinal through-passage that is arranged to permit a flow of fluid through the pig; and a blocking mechanism that is configured to block the flow of fluid through the through-passage in response to interaction with a discrete launching element that is conveyable to the pig, entrained in the flow of fluid, to engage the pig.

The through-passage may comprise an upstream funnel portion that is asymmetrical about a central longitudinal axis of the pig. For example, the funnel portion may have a different inclination relative to the central longitudinal axis of the pig on different sides of that axis. A downstream portion of the through-passage may be offset laterally from the central longitudinal axis of the pig.

The inventive concept also covers a pig of the invention and a launching element that is configured to interact with the pig by effecting blockage of the through-passage.

Embodiments of the invention propose the use of spheres as launching elements to launch selected ones of a series of pigs. When a kicker line is activated, fluid flows as a stream through a succession of orifices in the series of pigs. The spheres and the orifices vary in diameter; each sphere is dimensioned to lodge in a respective one of the orifices. The pigs are arranged with the largest-diameter orifice closest to a sphere magazine and then gradually smaller orifices moving away from the sphere magazine. Smaller spheres pass through a larger orifice of at least one upstream pig before lodging in the matchingly-sized orifice of a downstream pig.

Thus, when a pig is to be launched, the corresponding sphere is released into the stream of fluid. The sphere is designed to flow with the stream through the orifices of the pigs until it reaches the pig with an orifice of corresponding diameter. The sphere then blocks that orifice, effectively plugging the corresponding pig so that the flow through that pig is restricted. The resulting build-up of differential pressure causes that pig to be launched.

Embodiments of the invention implement a method for launching pigs successively into a pipeline, the method comprising the following steps: inserting at least two pigs inside a pipeline end, wherein the two pigs each comprise an inner longitudinal bore terminated by a funnel opening and the longitudinal bores are aligned and have increasing bore diameter in an upstream direction extending from downstream to upstream; closing the pipeline end and connecting a kicker line and a container or magazine of spheres; and launching at least one pig by injecting pressurised fluid from the kicker line and releasing at least one sphere from the container, wherein the diameter of the sphere is greater than the diameter of the longitudinal bore of a pig to be launched.

The spheres may be carried by the flow from the kicker line. The container may release the spheres in an order of increasing diameter.

In order that the invention may be more readily understood, reference will now be made, by way of example, to the accompanying drawings in which:

FIGS. 1 to 14 are a sequence of schematic sectional side views of a subsea pig launcher of the invention, when launching a series of pipeline pigs in succession;

FIGS. 19 and 20 are schematic sectional side view of a subsea pig launcher in a further variant of the invention.

Figure 9:
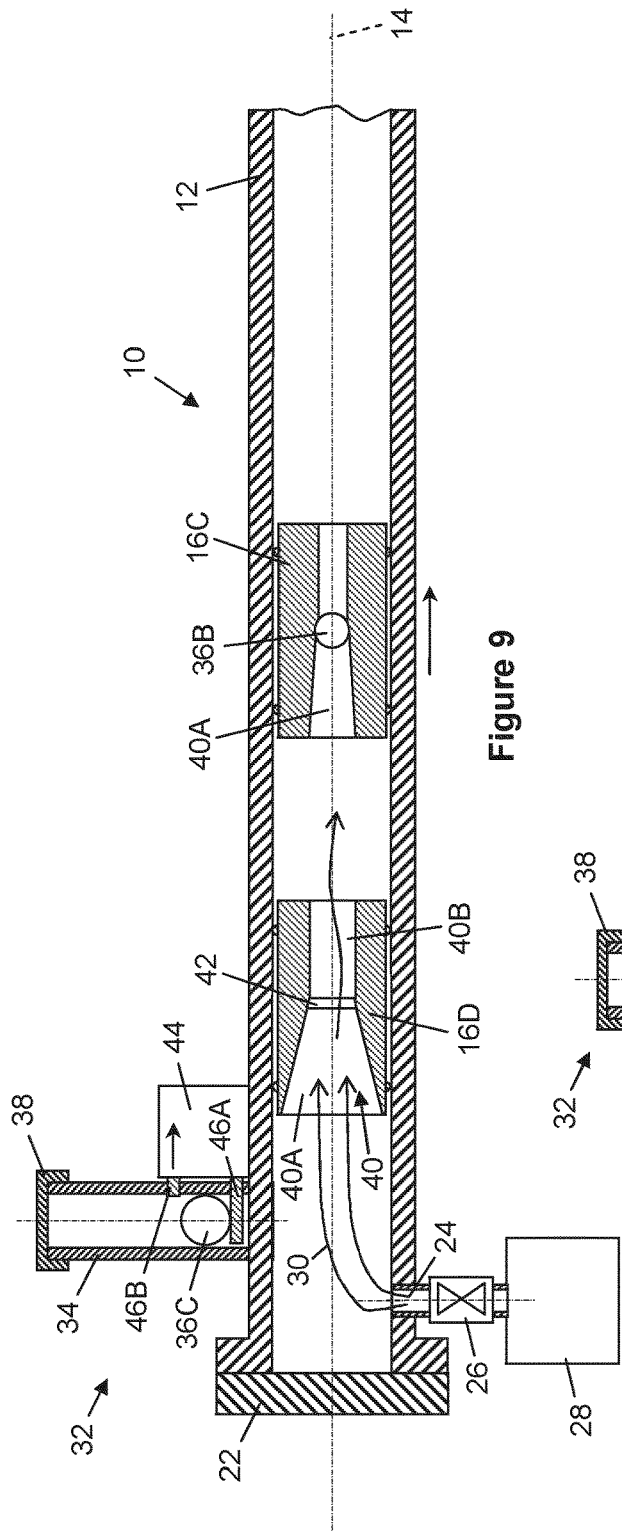

Referring firstly to the first embodiment of the invention shown in FIGS. 1 to 14 of the drawings, a subsea pig launcher 10 comprises a length of pipe defining an elongate tubular body 12 of circular cross-section. Thus, the body 12 is rotationally symmetrical about a central longitudinal axis 14. For simplicity, the body 12 is shown here as being substantially straight along its length but it could instead be curved along its length.

The body 12 defines a pig storage region that contains a set of pipeline pigs 16 disposed end-to-end in series. In this example, the full set as illustrated in FIGS. 1 and 2 comprises four pigs 16, namely a first or leading pig 16A, a second pig 16B, a third pig 16C and a fourth and final, trailing pig 16D. The order of the pigs from 16A to 16D is the order in which those pigs 16 will be launched successively in a launch direction 18 that extends from left to right as illustrated in FIG. 1. Of course, the set could comprise more pigs 16 or fewer pigs 16.

The pigs 16 are exemplified here as being of cylindrical outer shape. Other shapes of pigs are possible, such as spheres, ellipsoids or dumbbells, provided that they are of circular cross-section to be a close sliding fit within the body 12.

As is conventional, the pigs 16 shown here are provided with longitudinally-spaced resiliently-conformable circumferential outer seals 20 whose overall diameter is selected to be a close sliding or interference fit with the internal surface of the body 12.

One end of the body 12, to the right as illustrated, is open for communication with the interior of a subsea pipeline into which the pigs 16 are to be launched successively in the launch direction. The body 12 may be an end portion of the pipeline itself, hence in general alignment with the remainder of the pipeline, or may intersect the pipeline so that the pigs 16 enter the pipeline through an opening in a side wall of the pipeline. Both arrangements are conventional and so require no further elaboration here.

The other end of the body 12, to the left as illustrated, is closed and sealed by a closure that is exemplified here by an end cap 22. The end cap 22 is suitably movable or removable from the associated end of the body 12 to allow access through that end to the interior of the body 12. This allows the body 12 to be reloaded with a fresh set of pipeline pigs 16 if and when required.

The tubular side wall of the body 12 is penetrated by a kicker line 24 that serves as a fluid inlet to admit high-pressure fluid into the interior of the body 12 when launching a pig 16. In this example, the kicker line 24 enters the body 12 between the end cap 20 and the fourth and final pig 16D, but it could instead enter the body 12 through the end cap 20.

Fluid flow through the kicker line 24 is controlled by a valve 26, downstream of a fluid source 28. As is conventional, the valve 26 is shown in the drawings as white when open and as black when closed. When the valve 26 is open as shown in FIG. 2, fluid from the source 28 flows through the kicker line 24 into the body 12 and then streams along the interior of the body 12 in a flow direction 30 corresponding to the launch direction 18.

A launching mechanism 32 communicates with the interior of the body 12 at a longitudinal position between the kicker line 24 and the fourth and final pig 16D. More generally, the launching mechanism 32 is positioned at a location downstream of the kicker line 24 but upstream of the fourth and final pig 16D, with respect to the flow direction 30.

The launching mechanism 32 comprises a tube 34 that holds one or more launching elements, exemplified here by balls or spheres 36. The launching mechanism 32 further comprises an end closure 38 that can be moved or removed from the tube 34 to allow additional spheres 36 to be loaded when required.

The launching mechanism 32 is operable to release the spheres 36 successively into the stream of fluid that flows in the flow direction 30 within the body 12. When released from the launching mechanism 32 to be entrained in the flowing fluid and thereby to be conveyed to the series of pigs 16, each sphere 36 interacts with a respective one of the pigs 16 to launch that pig 16.

For this purpose, at least one of the set of pigs 16 has a longitudinally-extending bore or through-passage 40 that allows fluid to flow through that pig 16 from an upstream end of the pig 16 to a downstream end of the pig 16. The body 12 and the, or each, through-passage 40 are in mutual fluid communication and therefore together define a flow path extending in the flow direction 30. Fluid flows along the flow path in the flow direction 30 from the kicker line 24 toward the open end of the body 12, and in doing so flows through the through-passage 40 of at least one pig 16.

In this example, the or each through-passage 40 contains a part-spherical seat formation 42 whose radius of curvature matches the radius of a complementary sphere 36. On reaching the seat formation 42 after travelling along the through-passage 40 entrained in the flow of fluid, that complementary sphere 36 lodges in the through-passage 40 and can travel no further in the flow direction. The sphere 36 thereby blocks the flow of fluid through the through-passage 40.

In a portion upstream of the seat formation 42, the or each through-passage 40 comprises an inlet throat 40A that is wider than the diameter of the complementary sphere 36. Optionally, as shown, the inlet throat 40A tapers downstream in the flow direction toward the diameter of the seat formation 42. Conversely, in a portion downstream of the seat formation 42, the through-passage 40 comprises an outlet passage 40B that is narrower than the diameter of the complementary sphere 36. The outlet passage 40B is shown here as being of constant width although it could taper or flare in the downstream direction.

Not all of the pigs 16 require a through-passage 40. In particular, there is no need for a through-passage 40 in the first pig 16A which, as will be explained, can be launched simply by applying fluid pressure through the kicker line 24.

In this example, the second, third and fourth pigs 16B, 16C and 16D have respective through-passages 40 that are in mutual alignment and in mutual fluid communication. Here, each through-passage 40 is centred on, and rotationally symmetrical about, the central longitudinal axis 14, although this is not essential as further embodiments of the invention will show.

Similarly, the tube 34 of the launching mechanism 32 serves as a magazine for a corresponding set of spheres 36. The spheres 36 of the set increase in size from a first, smallest sphere 36A to a second, intermediate sphere 36B and a third, largest sphere 36C. The smallest sphere 36A is to be released from the launching mechanism 32 first and the largest sphere 36C is to be released last. Thus, in this example, the spheres 36 are held in series within the tube 34 with smallest sphere 36A closest to the body 12 of the launcher 10 and the largest sphere 36C furthest from the body 12.

The through-passages 40 and their seat formations 42 narrow from one pig 16 to the next in the flow direction 30. Conversely, the inlet throat 40A of the fourth pig 16D flares in an upstream direction to almost the full width of the fourth pig 16D. The inlet throat 40A of the fourth pig 16D thereby defines a funnel that effectively captures spheres 36 entrained in the fluid flow upstream of the fourth pig 16D. The funnel directs those spheres 36 into the mutually-aligned through-passages 40 of the second, third and fourth pigs 16B, 16C and 16D.

The diameters of the spheres 36A, 36B and 36C complement respective seat formations 42 of the second, third and fourth pigs 16B, 16C and 16D. Specifically, the diameter of the first sphere 36A complements the seat formation 42 of the second pig 16B, but is less than the minimum diameters of the through-passages 40 of the third and fourth pigs 16C and 16D. Similarly, the diameter of the second sphere 34B complements the seat formation 42 of the third pig 16C, but is less than the minimum diameter of the through-passage 40 of the fourth pig 16D. Conversely, the diameter of the third sphere 34C complements the seat formation 42 of the fourth pig 16B, but is too large to reach the through-passages 36 of the second and third pigs 16B and 16C.

To ensure that only one of the spheres 36 is released into the body 12 of the launcher 10 at a time, the launching mechanism 32 comprises a gate system 44 that segregates the sphere 36 to be released next from the or each sphere 36 that is to be released subsequently. In this example, the gate system 44 comprises inner and outer shutters 46A, 46B that can be moved independently to allow only one sphere 36 to pass at a time. Between them, the shutters 46A, 46B define a release chamber 48 that holds and isolates the sphere 36 to be released next.

When a pig 16 is to be launched, the inner shutter 46A is retracted, and hence opened, to release the corresponding sphere 36 from the release chamber 48. At that time, the outer shutter 46B remains extended, and hence closed, to prevent the or each other sphere 36 from being released prematurely. Conversely, when the inner shutter 46A is closed, the outer shutter 46B can be opened to allow the next sphere 36 into the release chamber 48, ready for release into the body 12 of the launcher 10 when required.

In the standby or ready state shown in FIG. 1, the valve 26 is held closed. When the first pig 14A is to be launched as shown in FIG. 2, the valve 26 is opened to admit high-pressure fluid into the body 12 through the kicker line 24. The fluid flows through the communicating through-passages 40 of the fourth, third and second pigs 16D, 16C and 16B in turn. The resulting overpressure on the upstream side of the first pig 16A propels the first pig 16A in the launch direction 18 as shown. The valve 26 may then be closed to stop the flow of fluid from the source 28. However, the valve 26 can be kept open to maintain the fluid flow if one or more further pigs 16 are to be launched in quick succession.

Spheres 36 can be transferred from the tube 34 into the release chamber 48 at any time before being released into the body 12. In this respect, FIG. 1 shows the outer shutter 46B of the gate system 44 being retracted to allow the first, smallest sphere 36A to fall from the tube 34 into the release chamber 48, as shown in FIG. 2. In this respect, the spheres 36 are suitably made of a dense material whose weight slightly exceeds their buoyancy, allowing them to fall toward the body 12 of the launcher 10 under gravity. Thus, the tube 34 of the launching mechanism is conveniently upright as shown, with the smallest sphere 36A at the bottom of the series of spheres 36.

When the second pig 14B is to be launched, the valve 26 is opened, if necessary, as shown in FIG. 3 to admit high-pressure fluid into the body 12 through the kicker line 24. Initially that fluid simply flows through the communicating through-passages 40 of the fourth, third and second pigs 16D, 16C and 16B in turn. Thus, with substantially equal pressure on both ends of each pig 16D, 16C and 16B, none of the pigs 16D, 16C and 16B will move.

Next, the first sphere 36A is released from the release chamber 48 by retracting the inner shutter 46A as shown in FIG. 3. This allows the first sphere 36A to fall under gravity into the interior of the body 12. On encountering the flow of fluid entering the body 12 through the kicker line 24, the first sphere 36A is entrained in the flow and propelled by the flow into the enlarged funnel-like inlet throat 40A of the fourth pig 16D. The inlet throat 40A of the fourth pig 16D guides the first sphere 36A into and along the communicating through-passages 40 of the fourth and third pigs 16D and 16C, as shown in FIG. 4.

The first sphere 36A is narrower than the through-passages 40 of the fourth and third pigs 16D and 16C and therefore rolls freely through the fourth and third pigs 16D and 16C and into the through-passage 40 of the second pig 16B. Here, the first sphere 36A lodges in the seat formation 42 of the second pig 16B, blocking the through-passage 40 as shown in FIG. 5. This causes fluid pressure to build on the upstream side of the second pig 16B. Eventually, the overpressure on the upstream side of the second pig 16B overcomes friction to propel the second pig 16B in the launch direction as shown in FIG. 6.

Again, the valve 26 may then be closed to stop the flow of fluid or may be kept open to maintain the fluid flow if one or more further pigs 16 are to be launched in quick succession. FIG. 5 also shows the outer shutter 46B of the gate system 44 being retracted to allow the second, intermediate sphere 36B to fall from the tube 34 into the release chamber 48, as shown in FIG. 6.

When the third pig 14C is to be launched, the valve 26 is opened, if necessary, as shown in FIG. 7 to admit high-pressure fluid into the body 12 through the kicker line 24. Initially that fluid simply flows through the communicating through-passages 40 of the fourth and third pigs 16D and 16C in turn. Again, with substantially equal pressure on both ends of each pig 16D and 16C, neither of the pigs 16D and 16C will move.

Next, the second sphere 36B is released from the release chamber 48 by retracting the inner shutter 46A as shown in FIG. 7. This allows the second sphere 36B to fall into the interior of the body 12 and to be entrained in the flow of fluid that enters the body 12 through the kicker line 24. Again, the second sphere 36B is propelled by the flow into the funnel-like inlet throat 40A of the fourth pig 16D. This guides the second sphere 36B into and along the through-passage 40 of the fourth pig 16D.

The second sphere 36B is narrower than the through-passage 40 of the fourth pig 16D and therefore rolls freely through the fourth pig 16D and into the through-passage 40 of the third pig 16C. Here, the second sphere 36B lodges in the seat formation 42 of the third pig 16C, blocking the through-passage 40 as shown in FIG. 8. This causes fluid pressure to build on the upstream side of the third pig 16C until the overpressure overcomes friction to propel the third pig 16C in the launch direction as shown in FIG. 9.

Again, the valve 26 may then be closed to stop the flow of fluid or may be kept open to maintain the fluid flow if the fourth pig 16D is to be launched in quick succession. FIG. 9 also shows the outer shutter 46B of the gate system 44 retracted to allow the third, largest sphere 36C to fall from the tube 34 into the release chamber 48.

Figure 10:
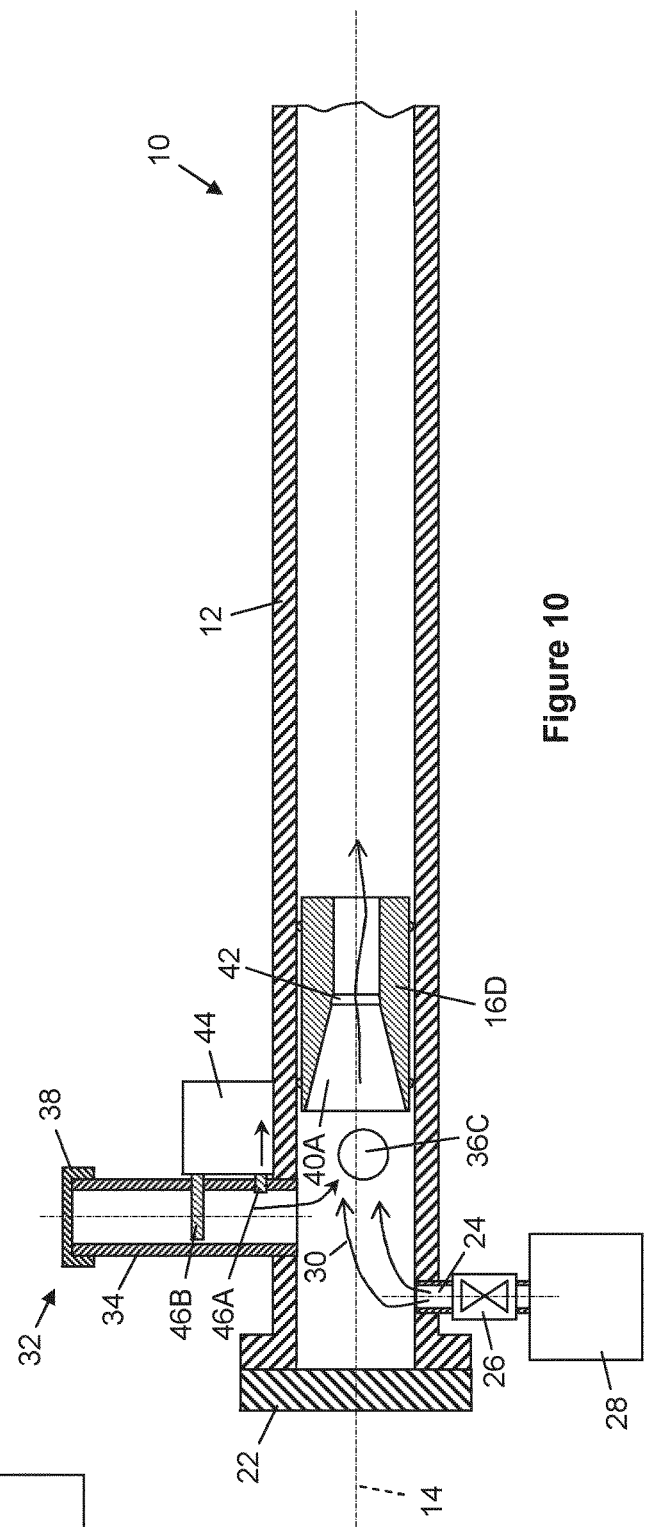

Finally, when the fourth pig 16D is to be launched, the valve 26 is opened, if necessary, as shown in FIG. 10 to admit high-pressure fluid into the body 12 through the kicker line 24. Initially that fluid simply flows through the through-passage 40 of the fourth pig 16D so that, with substantially equal pressure on both ends, the fourth pig 16D will not move.

Then, the third sphere 36C is released from the release chamber 48 by retracting the inner shutter 46A as shown in FIG. 10. This allows the third sphere 36C to fall into the interior of the body 12 and to be entrained in the flow of fluid that enters the body 12 through the kicker line 24. The third sphere 36C is propelled by the flow into the funnel-like inlet throat 40A of the fourth pig 16D to lodge in the seat formation 42, blocking the through-passage 40 as shown in FIG. 11. This causes fluid pressure to build on the upstream side of the fourth pig 16D until the overpressure overcomes friction to propel the fourth pig 16D in the launch direction as shown in FIG. 12.

FIGS. 13 to 20 show some examples of variants of the invention.

FIGS. 13 and 14 show that at least some of the through-passages 40 of the pigs 16 may be asymmetrical with respect to the central longitudinal axis 14. For example, in the fourth pig 16D of FIG. 13, the outlet passage 40B defined by the downstream portion of the through-passage 40 is offset laterally from the central longitudinal axis 14 away from the kicker line 24. The inlet throat 40A of the fourth pig 16D is correspondingly asymmetrical, with the side of the inlet throat 40A that is closer to the kicker line 24 being more steeply inclined relative to the central longitudinal axis 14 than the opposite side of the inlet throat 40A that is remote from the kicker line 24. In this example, the inlet throat 40A of the third pig 16C is also asymmetrical to align with the laterally-offset outlet passage 40B of the fourth pig 16D, and to channel the flow path back onto the central longitudinal axis 14.

In the fourth pig 16D of FIG. 14, the outlet passage 40B defined by the downstream portion of the through-passage 40 is positioned on the central longitudinal axis 14. However, the inlet throat 40A of the fourth pig 16D is also asymmetrical in that the side of the inlet throat 40A that is closer to the kicker line 24 is less steeply inclined relative to the central longitudinal axis 14 than the opposite side of the inlet throat 40A that is remote from the kicker line 24.

Their asymmetry reflects how the funnel-like inlet throats 40A of the fourth pigs 16D in FIGS. 13 and 14 may be adapted to receive the spheres 36 that are entrained in the flow of fluid from the kicker line 24. In this respect, the flow of fluid is itself asymmetrical by virtue of the laterally offset position of the kicker line 24 with respect to the body 12. In this respect, the asymmetrical funnel shapes shown in FIGS. 13 and 14 help to ensure that the spheres 36 will not become stuck in an intermediate position by virtue of fluid flow that is not parallel to the launch direction.

FIG. 14 also shows that not just the fourth pig 16D can have an enlarged, funnel-like inlet throat 40A. In this example, the second and third pigs 16B, 16C also have such inlet throats 40A.

Figure 16:
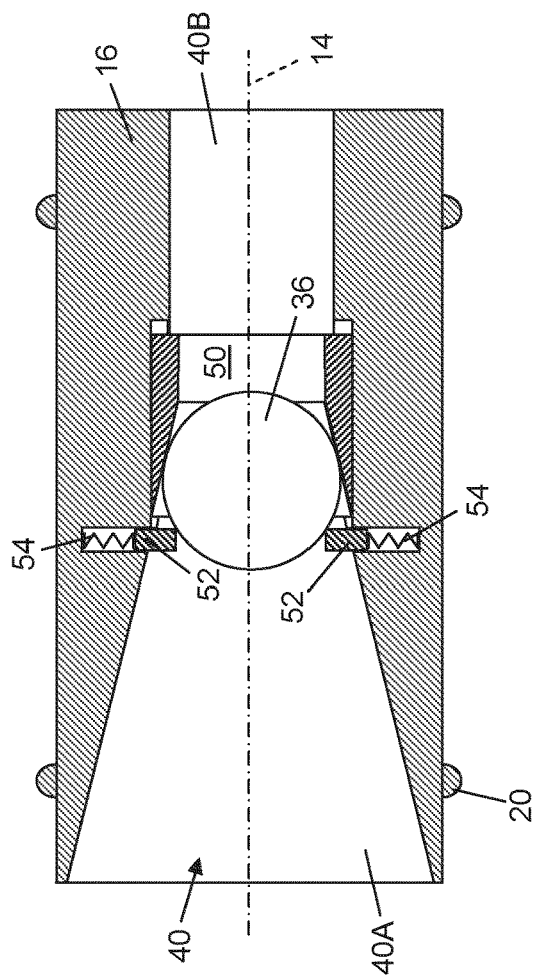
FIGS. 15 and 16 are enlarged schematic sectional side views of a pipeline pig in a variant of the invention showing how a launching element may be held in a sealing position, engaged with the pig to block a passageway extending through the pig.
Figure 15:
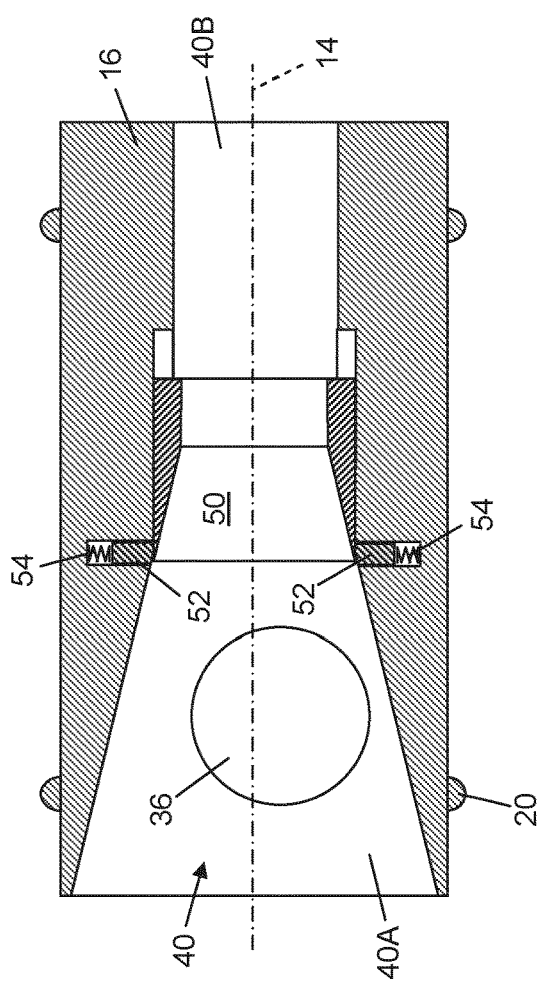

FIGS. 15 and 16 exemplify how a sphere 36 can be locked to a pig 16 after engaging with the pig 16. This ensures that the sphere 36 will continue to block the through-passage 40 of the pig 16 even if the pressure of the flowing fluid is not steady at a sufficient level or if the flow is not laminar. In particular, if the fluid pressure fluctuates or decreases, the pig 16 could be only partially launched and then the sphere 36 could fall backwards onto the upstream side of the pig 16. In this respect, the flow rate through another pig 16 on the upstream side, which acts as a flow reducer, may be insufficient to push the sphere 36 back into the pig 16 being launched. This would lose the advantage of being able to launch the pigs 16 separately.

In FIGS. 15 and 16, the sphere 36 is received within, and seals against, a circumferentially-continuous, frusto-conical tapering sleeve 50 that is mounted in the through-passage 40 of the pig 16. On receiving the sphere 36, the sleeve 50 slides longitudinally relative to the pig 16 from an initial upstream position shown in FIG. 15 to a downstream position shown in FIG. 16. In doing so, the upstream end of the sleeve 50 uncovers and frees latches 52 that are biased by springs 54 toward the central longitudinal axis 14. The latches 52 are shown held by the sleeve 50 in a retracted position in FIG. 15 and moved into a deployed position in FIG. 16 under the bias of the springs 54. When in the deployed position, the latches 52 bear against the upstream side of the sphere 36 to prevent the sphere 36 falling back out of sealing engagement with the sleeve 50.

Figure 17:
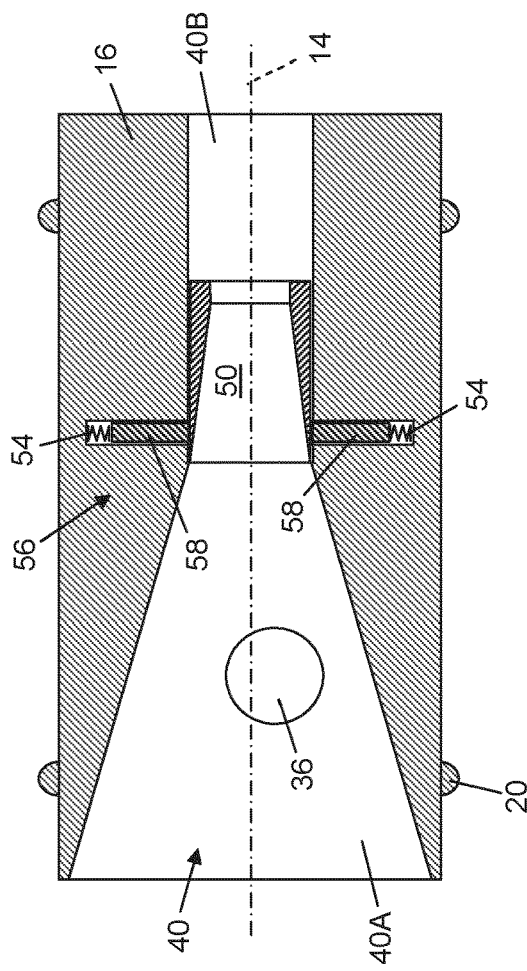
FIGS. 17 and 18 are enlarged schematic sectional side views of a pipeline pig in a further variant of the invention, showing how a launching element may trigger a blocking mechanism that blocks a passageway extending through the pig.
Figure 18:
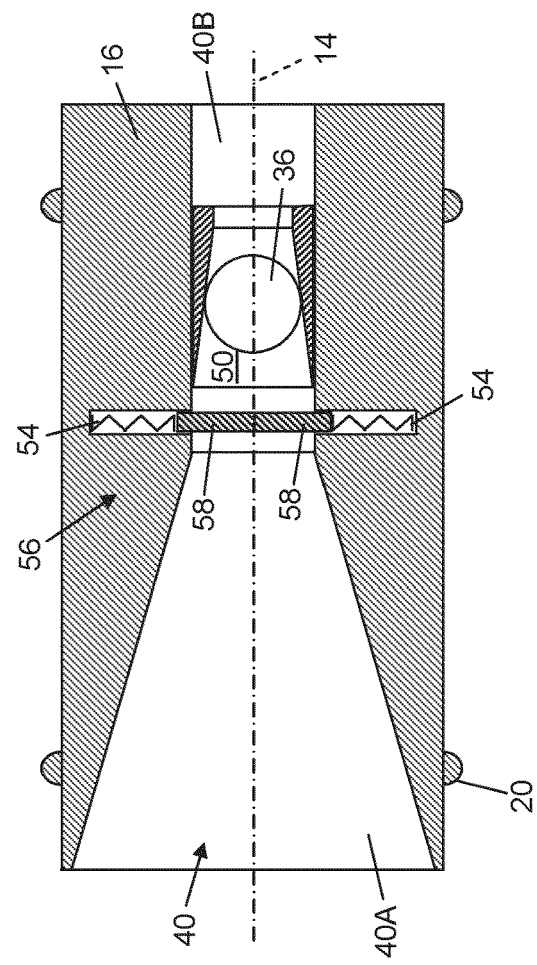

FIGS. 17 and 18 show a variant of the arrangement shown in FIGS. 15 and 16. This shows that a launching element such as the sphere 36 need not itself block the through-passage 40 but could instead trigger a blocking mechanism 56 that blocks the flow of fluid along the through-passage 40.

In FIGS. 17 and 18, the blocking mechanism 56 comprises shutter elements 58 that are biased by springs 54 toward the central longitudinal axis 14. Again, the sphere 36 impacts and slides a sleeve 50 in the through-passage 40 of the pig 16 from an upstream position shown in FIG. 17 to a downstream position shown in FIG. 18. In this case, however, the sleeve 50 need not be continuous circumferentially because the sphere 36 does not have to seal against the sleeve 50. Instead, movement of the sleeve 50 frees shutter elements 58 that come together to block the through-passage.

The shutter elements 58 are shown held by the sleeve 50 in a retracted position in FIG. 17 and moved into a deployed position in FIG. 18 under the bias of the springs 54. When in the deployed position shown in FIG. 18, the shutter elements 58 come together across the through-passage 40 to prevent or restrict fluid flow along the through-passage 40.

The shutter elements 58 could move relative to the pig 16 in various ways. For example, the shutter elements 58 can move transversely or orthogonally relative to the central longitudinal axis 14, sliding in translation or turning about a pivot axis that is generally parallel to the central longitudinal axis 14. Alternatively the shutter elements 58 could be flaps that are hinged about pivot axes orthogonal to the central longitudinal axis 14.

Whilst launching elements such as spheres are stacked in the examples shown, this is not essential. Also, the spheres or other launching elements do not have to be released in a predetermined order; they could instead be arranged so that any sphere can be released before any other sphere. These possibilities are illustrated in the variant shown in FIGS. 19 and 20.

In FIGS. 19 and 20, the first and second pigs 16A and 16B of the preceding embodiment shown in FIGS. 1 to 12 have already been launched whereas the third and fourth pigs 16C and 16D are still within the body 12 of the launcher 10, awaiting launch. Each of the third and fourth pigs 16C and 16D has a respective through-passage 40 that is configured as in the preceding embodiment.

In FIGS. 19 and 20, the launching mechanism 32 of the preceding embodiment is distributed into independent launching mechanisms 32A, 32B and 32C, each holding a respective sphere 36. When a pig 16 is to be launched, the appropriate launching mechanisms 32A, 32B and 32C are activated independently by a control system 60 to release the associated spheres 36.

The launching mechanism 32A shown in FIG. 19 has already released the first, smallest sphere 36A to launch the second pig 16B. The launching mechanisms 32B and 32C shown in FIG. 19 are still holding the second, intermediate sphere 36B and the third, largest sphere 36C respectively. Conversely, the launching mechanism 32B shown in FIG. 20 has released the second sphere 36B to launch the third pig 16C. Having then been entrained by the flow of fluid from the kicker line 24, which flow is enabled by the now open valve 26, the second sphere 36B is shown here travelling along the through-passage 40 of the fourth pig 16D. The second sphere 36B will then lodge in the seat formation 42 of the third pig 16C to effect its launch.

It will be apparent that the spheres 36 held by the launching mechanisms 32A, 32B and 32C could be launched in any order. For example, the third, largest sphere 36C could be released before the second, intermediate sphere 36B. This would have the effect of launching the third and fourth pigs 16C and 16D together, with the third pig 16C being pushed ahead of the fourth pig 16D.

In the example shown in FIGS. 19 and 20, the spheres 36 are held within the body 12 of the pig launcher 10 although it would be possible instead for the spheres 36 to be held outside the body 12, for example in the manner of the preceding embodiment. Also, the launching mechanisms 32A, 32B and 32C are distributed both circumferentially around the body 12 and longitudinally along the body 12 in this example. In other examples, a circumferential or longitudinal distribution arrangement could be adopted alone.

Other variations are possible within the inventive concept. For example, the pigs of the series, or at least their through-passages, may be in direct or unbroken contact with each other.

If the series of pigs is in a vertical or upright orientation, gravity can help the spheres to enter the pigs.

In a broad sense, the inventive concept is not limited to pig launching. Fluid-transportable elements such as spheres entrained in a flow of fluid could also be used to activate valves or other equipment.

The invention claimed is:

1. A method of launching a pipeline pig comprising:
    said pig having a longitudinal through passage that is arranged to permit a flow of fluid through the pig, the through passage comprising a relatively wide upstream funnel portion that is asymmetrical about a central longitudinal axis of the pig, and a relatively narrow downstream portion; and
    a seat for a discrete launching element that, when positioned in the seat, blocks the flow of fluid through the through passage, the launching element being conveyable to the pig entrained in the flow of fluid to engage the pig, wherein the seat is disposed between the relatively wide upstream funnel portion and the relatively narrow downstream portion of the through passage,
    wherein the method comprises:
    directing a flow of fluid to, and through, the pig being launched;
conveying a launching element to the pig by entraining the launching element in the flow of fluid;
    engaging the launching element with the pig being launched; and
    by interaction between the launching element and the pig, blocking the flow of fluid through the pig to launch the pig.

2. The method of claim 1, comprising locking the engaged launching element to the pig being launched.

3. The method of claim 1, comprising holding the launching element against the pig by virtue of differential pressure applied to the launching element.

4. The method of claim 1, wherein the launching element serves as a barrier to the flow of fluid through the pig when so engaged.

5. The method of claim 1, wherein the launching element interacts with the pig being launched by triggering a blocking mechanism of that pig, which mechanism consequently blocks the flow of fluid through that pig.

6. The method of claim 1, comprising directing the flow of fluid through at least one other pig to be launched subsequently, which pig is positioned upstream of the pig being launched, with respect to the flow of fluid.

7. The method of claim 6, comprising allowing the launching element to pass through the or each other pig with the flow of fluid.

8. The method of claim 6, comprising releasing a succession of launching elements into the flow of fluid, each launching element being configured to interact with, and thereby to block the flow of fluid through, a respective one of a series of pigs disposed end to end in longitudinal succession.

9. The method of claim 8, wherein the successively released launching elements are of increasing diameter from element to element.

10. The method of claim 1, wherein the or each launching element has substantially neutral or slightly negative buoyancy in the flowing fluid.

11. The method of claim 1, wherein the or each launching element is substantially spherical.

12. A launcher for pipeline pigs comprises a tubular body having:

a fluid inlet and an open end, defining a flow direction extending along a flow path within the body from the fluid inlet to the open end;

a pig storage region in the flow path for holding a series of pigs; and at least one launching mechanism, positioned upstream of the pig storage region with respect to the flow direction;

wherein the or each launching mechanism is configured to hold at least one launching element and is operable to release the or each launching element into the flow path to launch a pig of the series in use;

the launcher further comprising a pig held in the pig storage region and a launching element held in the at least one launching mechanism;

wherein the pig comprises a longitudinal through passage that is arranged to permit a flow of fluid through the pig in the flow direction along the flow path, wherein at least a portion of the through passage is narrower than the launching element, the through passage comprising a relatively wide upstream funnel portion that is asymmetrical about a central longitudinal axis of the pig, and a relatively narrow downstream portion; and a seat for the launching element, wherein the seat is disposed between the relatively wide upstream funnel portion and the relatively narrow downstream portion of the through passage; and wherein the launching element is configured to engage the pig and to block the flow of fluid along the through passage to launch the pig, in response to releasing the launching element from the at least one launching mechanism onto the flow path.

13. The launcher of claim 12, wherein the seat is shaped to complement the launching element.

14. The launcher of claim 12, wherein an upstream portion of the through passage is wider than the launching element and a downstream portion of the through passage is narrower than the launching element.

15. The launcher of claim 14, wherein at least a portion of the through passage tapers downstream with respect to the flow direction.

16. The launcher of claim 12, wherein the pig storage region contains a series of pigs disposed end to end in longitudinal succession in the flow direction, the through passages of at least two pigs of the series being in mutual fluid communication.

17. The launcher of claim 16, wherein the communicating through passages of the at least two pigs are in mutual radial alignment with respect to a central longitudinal axis of the tubular body.

18. The launcher of claim 16, wherein the through passages of the at least two pigs have respective minimum widths that reduce from pig to pig in the flow direction.

19. The launcher of claim 12, wherein the or each launching element is substantially spherical.

20. A pipeline pig, comprising:
a longitudinal through passage that is arranged to permit a flow of fluid through the pig, the through passage comprising a relatively wide upstream funnel portion that is asymmetrical about a central longitudinal axis of the pig, and a relatively narrow downstream portion; and a seat for a discrete launching element that, when positioned in the seat, blocks the flow of fluid through the through passage, the launching element being conveyable to the pig entrained in the flow of fluid to engage the pig, wherein the seat is disposed between the relatively wide upstream funnel portion and the relatively narrow downstream portion of the through passage.

21. The pig of claim 20, wherein the funnel portion has different inclination relative to the central longitudinal axis of the pig on different sides of that axis.

22. The pig of claim 20, wherein a downstream portion of the through passage is offset laterally from the central longitudinal axis of the pig.

23. A pipeline pig, comprising:
a longitudinal through passage that is arranged to permit a flow of fluid through the pig; and a blocking mechanism that is configured to block the flow of fluid through the through-passage in response to interaction with a discrete launching element that is conveyable to the pig, entrained in the flow of fluid, to engage the pig, wherein the blocking mechanism comprises a sleeve and shutter elements, the sleeve being arranged to move in the through-passage from an upstream position to a downstream position when engaged by the launching element, and wherein movement of the sleeve causes the shutter elements to come together to block the flow of fluid through the through-passage.

24. The pig of claim 23, wherein the through passage comprises an upstream funnel portion that is asymmetrical about a central longitudinal axis of the pig.

25. The pig of claim 24, wherein the funnel portion has different inclination relative to the central longitudinal axis of the pig on different sides of that axis.

26. The pig of claim 24, wherein a downstream portion of the through passage is offset laterally from the central longitudinal axis of the pig.

27. In combination, the pig of claim 20 and a launching element that is configured to interact with the pig by effecting blockage of the through passage.

28. The combination of claim 27, wherein the launching element is substantially spherical.

29. In combination, the pig of claim 23 and a launching element that is configured to interact with the pig by effecting blockage of the through passage.

30. The combination of claim 29, wherein the launching element is substantially spherical.

* * * * *